(12) United States Patent
Wang et al.

(10) Patent No.: US 11,401,627 B2
(45) Date of Patent: Aug. 2, 2022

(54) METHOD FOR PREPARING QUANTUM ROD/POLYMER FIBER MEMBRANE BY USING ELECTROSPINNING TECHNIQUE

(71) Applicant: SOUTH UNIVERSITY OF SCIENCE AND TECHNOLOGY OF CHINA, Shenzhen (CN)

(72) Inventors: Kai Wang, Shenzhen (CN); Ziming Zhou, Shenzhen (CN); Jing Qin, Shenzhen (CN); Zuoliang Wen, Shenzhen (CN); Shang Li, Shenzhen (CN); Junjie Hao, Shenzhen (CN); Wei Chen, Shenzhen (CN); Xiaowei Sun, Shenzhen (CN)

(73) Assignee: SOUTH UNIVERSITY OF SCIENCE AND TECHNOLOGY OF CHINA, Shenzhen (CN)

( * ) Notice: Subject to any disclaimer, the term of this patent is extended or adjusted under 35 U.S.C. 154(b) by 416 days.

(21) Appl. No.: 16/344,832

(22) PCT Filed: Nov. 15, 2016

(86) PCT No.: PCT/CN2016/105831
§ 371 (c)(1),
(2) Date: Apr. 25, 2019

(87) PCT Pub. No.: WO2018/076408
PCT Pub. Date: May 3, 2018

(65) Prior Publication Data
US 2019/0249337 A1    Aug. 15, 2019

(30) Foreign Application Priority Data

Oct. 26, 2016   (CN) .......................... 201610946860.3

(51) Int. Cl.
| | | |
|---|---|---|
| D01F 1/10 | (2006.01) | |
| C09K 11/88 | (2006.01) | |
| C09K 11/56 | (2006.01) | |
| C09K 11/02 | (2006.01) | |
| D01D 1/02 | (2006.01) | |
| D01D 5/00 | (2006.01) | |
| C09K 11/62 | (2006.01) | |
| D04H 1/728 | (2012.01) | |
| B82Y 40/00 | (2011.01) | |
| B82Y 20/00 | (2011.01) | |

(52) U.S. Cl.
CPC .............. *D01F 1/10* (2013.01); *C09K 11/02* (2013.01); *C09K 11/565* (2013.01); *C09K 11/623* (2013.01); *C09K 11/883* (2013.01); *D01D 1/02* (2013.01); *D01D 5/0038* (2013.01); *D01D 5/0076* (2013.01); *D01D 5/0092* (2013.01); *D04H 1/728* (2013.01); *B82Y 20/00* (2013.01); *B82Y 40/00* (2013.01)

(58) Field of Classification Search
CPC ... D01D 5/0076; D01D 5/0038; D01D 5/0092
See application file for complete search history.

(56) References Cited

U.S. PATENT DOCUMENTS

| | | | | |
|---|---|---|---|---|
| 9,853,324 B2* | 12/2017 | Chan | ..................... | H01M 4/136 |
| 9,899,575 B2* | 2/2018 | Liu | ........................ | C09K 11/02 |
| 10,174,249 B2* | 1/2019 | Kim | ...................... | C09K 11/562 |
| 2006/0204539 A1* | 9/2006 | Atala | .................. | D01D 5/0007 |
| | | | | 424/423 |
| 2013/0229091 A1* | 9/2013 | Yu | ......................... | H01L 41/193 |
| | | | | 310/367 |
| 2014/0272225 A1* | 9/2014 | Johnson | ............... | D01D 5/0076 |
| | | | | 428/36.1 |
| 2015/0063663 A1 | 3/2015 | Wu | | |

(Continued)

FOREIGN PATENT DOCUMENTS

| | | |
|---|---|---|
| CN | 102944538 A | 2/2013 |
| CN | 104451912 A | 3/2015 |

(Continued)

OTHER PUBLICATIONS

International Search Report and Written Opinion Form PCT/ISA/220 and PCT/ISA/237, International Application No. PCT/CN2016/105831, pp. 1-7, dated Apr. 27, 2017.

ACS Photonics—"Large-Scale and Electroswitchable Polarized Emission from Semiconductor Nanorods Aligned in Polymeric Nanofibers" Aubert, et al. Feb. 13, 2015, 6 pages.

(Continued)

*Primary Examiner* — Xiao S Zhao
*Assistant Examiner* — Emmanuel S Luk
(74) *Attorney, Agent, or Firm* — George McGuire (57) ABSTRACT

Disclosed is a method for preparing a quantum rod/polymer fiber membrane by using electrospinning technique. The method comprises the following steps: (1) preparing a quantum rod solution; (2) preparing a polymer solution, and adding the quantum rod solution obtained in step (1) into the polymer solution so as to form an electrospinning precursor solution with a volume concentration of the quantum rods of 5%-80%; and (3) adding the electrospinning precursor solution into an electrospinning device, regulating the voltage of a generator and the receiving distance, and then performing electrospinning to prepare the quantum rod/polymer fiber membrane. By adjusting the concentration of the quantum rod solution and parameters in the electrospinning process, the method realizes directional arrangements of the quantum rods in the electrospinning process, thereby obtaining the quantum rod/polymer fiber membrane with high degree of polarization performance.

15 Claims, 4 Drawing Sheets

(56) References Cited

U.S. PATENT DOCUMENTS

| | | | | |
|---|---|---|---|---|
| 2015/0076742 | A1* | 3/2015 | Joo | D01F 1/02 |
| | | | | 264/433 |
| 2016/0200974 | A1* | 7/2016 | Smith | C09K 11/892 |
| | | | | 252/301.6 S |
| 2017/0123127 | A1* | 5/2017 | Hasegawa | C09K 11/883 |
| 2017/0323991 | A1* | 11/2017 | Klimov | C09K 11/883 |
| 2018/0203302 | A1* | 7/2018 | Kim | H01L 33/501 |
| 2018/0212202 | A1* | 7/2018 | Yang | H01L 33/0083 |

FOREIGN PATENT DOCUMENTS

| | | |
|---|---|---|
| CN | 104835439 A | 8/2015 |
| CN | 104992631 A | 10/2015 |
| CN | 105046243 A | 11/2015 |
| CN | 105602227 A | 5/2016 |
| CN | 106951130 A | 7/2017 |
| JP | 2013531740 A | 8/2013 |
| KR | 20160002470 A | 1/2016 |
| TW | 201610485 A | 3/2016 |

International Search Report and Written Opinion Form PCT/ISA/220 and PCT/ISA/237, International Application No. PCT/CN2016/105831, pp. 1-7, International Filing Date Nov. 15, 2016, dated Jan. 16, 2018.

\* cited by examiner

METHOD FOR PREPARING QUANTUM ROD/POLYMER FIBER MEMBRANE BY USING ELECTROSPINNING TECHNIQUE

CROSS REFERENCE TO RELATED APPLICATIONS

The present application is the U.S. National Phase Entry of PCT Application No. PCT/CN2016/105831 filed on Nov. 15, 2016, claims priority to Chinese patent application No. 201610946860.3, filed on Oct. 26, 2016, the entire contents of each of which are incorporated herein by reference.

TECHNICAL FIELD

The present invention belongs to field of optical materials, relates to a method for preparing a quantum rod/polymer fiber membrane, and particularly to a method for preparing a quantum rod/polymer fiber membrane by using electrospinning technique.

BACKGROUND

A quantum rod material is a crystalline material with a diameter of a few nanometers and a length of 10-100 nm, having similar optical properties to quantum dots such as absorption and luminescence properties. Moreover, the control and adjustment to light wave can be realized by adjusting the size and category of quantum rods; and quantum rods have an adjustable luminescence wavelength over the entire visible range.

Quantum rods further have the optical properties that are not possessed by the quantum dot due to the elongated morphology, wherein the most special optical property of quantum rods is the property of emitting polarized light and even emitting the polarized light parallel to long axis and perpendicular to minor axis thereof. This luminescence property of quantum rods makes it possible to obtain polarized light in the long axis direction of the quantum rods arranged along a predefined axial direction.

At present, there are many studies on the polarization performance of quantum rods, however, most of them are for the analysis of quantum rods as single particles, and there is little analysis about the polarization of quantum rods presenting in a large amount. This is because the polarization effect of a quantum rod is along the axial direction of the rod-shaped material, accordingly, in the case where a large number of quantum rods are freely distributed, the linearly polarized light emitted by each quantum rod along the respective axial directions is also freely distributed, and thus the overall polarization performance cannot be exhibited. Therefore, in order to obtain a quantum rod-containing material with significant polarization performance, it is necessary to arrange the quantum rods in orientation manner.

There are not many existing methods for arranging quantum rod materials in orientation manner, for example, a mechanical stretching method has been used to obtain a quantum rod film material, which method, however, has a large material loss and a limited orientation effect.

CN104992631A discloses a method for preparing a quantum rod membrane comprising steps of: forming a transparent membrane on a substrate; forming a plurality of strip-shaped grooves on the transparent membrane; and forming a quantum rod layer on the guiding membrane, which quantum rod layer comprises a curing glue and quantum rods and an electrical field induction monomer doped in the curing glue; applying an electric field to the quantum rod layer so that the electric field induction monomer drives the quantum rod to arrange along the strip-shaped groove under the action of the electric field; and curing the curing glue to fix the quantum rods.

CN105602227A discloses a method for preparing a quantum rod membrane comprising the steps of: forming a plurality of pixel electrodes and a plurality of common electrodes on a substrate; coating a quantum rod composition on the substrate, which quantum rod composition comprises a plurality of quantum rods, a polymer containing a main chain and a plurality of dipole side chains attached to the main chain, and a solvent; generating an electric field between the plurality of pixel electrodes and the plurality of common electrodes; and curing the quantum rod composition to form a quantum rod membrane on the substrate. Wherein, the long axes of the plurality of quantum rods and the axes of the plurality of dipole side chains are arranged in a direction substantially parallel to the electric field.

The above processes for preparing a quantum rod membrane all achieve the purpose of directional arrangement of quantum rods in a fixed orientation by the method of electric field induction in combination with cure of curing substance. However, the above processes just obtain quantum rod membranes having a limited degree of directional arrangement, and are complicated in operation, cumbersome in process, poor in controllability and difficult to produce quantum rod membranes efficiently and in a great quantity.

Nanowires are nanostructures having dimensions in nanometers, wherein the nanostructures have a variety of diameter sizes from less than 10 nm to several hundred nm. At present, ordered one-dimensional nanowires can be produced by techniques such as template method, self-assembly method, electric field induction, magnetic field induction, chemical/biological molecule affinity assembly, magnetic dipole selection, imprint transfer, etching, electrospinning, etc. Among them, the electrospinning technology can make the polymer solution charged with static electricity in the electrostatic field, so that the solution forms a Taylor cone under the action of its own viscous force, surface tension, internal charge repulsive force and external electric field force. When the externally applied static voltage increases to beyond a certain critical value, the electric field force applied to the polymer solution overcomes the surface tension and the viscous force so as to form a fine jet stream, and the solvent evaporates during the jetting process while the polymer solute gradually solidifies and eventually falls on the collector device to form a continuous micro/nano fiber. The electrospinning technology has attracted increasing attention from researchers due to its simple preparation process and low cost, which was originally used mainly for production and research in the textile field. With the progress of research, the electrospinning technology has been introduced into the preparation of functional materials. And fibers with a diameter ranging from tens to hundreds of nanometers can be obtained by using electrospinning technology, which is a relatively simple, efficient and versatile method.

In the existing technologies, the electrospinning technology is mainly used to prepare quantum dot/polymer fiber membranes but has not used to prepare quantum rod/polymer fiber membranes. This is mainly because in the case where quantum rods are abundantly present and freely distributed, it is difficult to arrange them according to the systematic arrangement of the spun filaments in the electrospinning process, and thus it is impossible to obtain a quantum rod material having a remarkable high degree of polarization performance.

Consequently, it is an urgent issue to research a quantum rod/polymer fiber membrane with high degree of polarization performance by a method with simple operation and process as well as high controllability.

SUMMARY

In view of the problems existing in the existing methods such as complicated operation, cumbersome process, the poor controllability, and the limited directional arrangement degree of the prepared quantum rod membrane, the present invention provides a method for preparing a quantum rod/polymer fiber membrane by using electrospinning technique. By adjusting the concentration of the quantum rod solution and parameters in the electrospinning process, the method realizes directional arrangements of the quantum rods in the electrospinning process, thereby obtaining the quantum rod/polymer fiber membrane with high degree of polarization performance.

For the purpose, the present invention adopts the following technical solutions:

In one aspect, the present invention provides a preparation method of a quantum rod/polymer fiber membrane comprising the following steps:

(1) preparing a quantum rod solution;

(2) preparing a polymer solution, and adding the quantum rod solution obtained in step (1) into the polymer solution so as to form an electrospinning precursor solution with a volume concentration of the quantum rods of 5%-80%;

(3) adding the electrospinning precursor solution prepared in step (2) into an electrospinning device, regulating the voltage of a generator and the receiving distance, and then performing electrospinning to prepare the quantum rod/polymer fiber membrane.

Wherein, the volume concentration of the quantum rods in the electrospinning precursor solution can be 5%, 10%, 15%, 20%, 25%, 30%, 35%, 40%, 45%, 50%, 55%, 60%, 65%, 70%, 75% or 80% etc., but not limited to the numerical values recited herein, and other numerical values within this numerical range which are not recited herein are equally applicable.

The "quantum rod/polymer fiber membrane" mentioned in the present invention refers to a composite fiber membrane of a quantum rod and a polymer.

By adjusting the concentration of the quantum rod solution and parameters in the electrospinning process, the present invention realizes directional arrangements of the quantum rods in the electrospinning process. Therefore, the volume concentration of the quantum rods in the electrospinning precursor solution needs to be controlled within a certain range.

The following are preferred technical solutions of the present invention, but are not intended to limit the technical solutions provided by the present invention. The technical objects and advantageous effects of the present invention can be better implemented and achieved by the following technical solutions.

As a preferred technical solution of present invention, the quantum rod solution in step (1) is prepared from a quantum material.

Preferably, the quantum material is a single-core material or a core-shell coated material, preferably a core-shell coated material.

Preferably, the single-core material is any one selected from the group consisting of CdSe, CdTe, CdS, ZnSe, CdTe, CuInS, InP, CuZnSe and ZnMnSe, and a combination of at least two selected therefrom, wherein the typical but non-limiting examples of the combination include: a combination of CdSe and CdTe, a combination of CdS and ZnSe, a combination of CdTe and CuInS, a combination of InP and CuZnSe, a combination of CuZnSe and ZnMnSe, a combination of CdSe, CdTe and CdS, a combination of ZnSe, CdTe and CuInS, a combination of InP, CuZnSe and ZnMnSe, a combination of CdSe, CdTe, CdS, ZnSe and CdTe, and the like, preferably CdSe.

Preferably, the core-shell coated material has a single-core material as a core thereof, and a shell layer material selected from the group consisting of CdS, ZnO, ZnS, ZnSe and ZnTe, and a combination of at least two selected therefrom, wherein the typical but non-limiting examples of the combination include: a combination of CdS and ZnO, a combination of ZnS and ZnSe, a combination of ZnSe and ZnTe, a combination of CdS, ZnO and ZnS, a combination of CdS, ZnO, ZnS, ZnSe and ZnTe, and the like, preferably CdS.

As a preferred technical solution of present invention, the quantum rod solution is a CdSe/CdS quantum rod solution prepared from a core-shell coated material having CdSe as a core and CdS as a shell layer material.

In the present invention, the preparation method of the other quantum rod solution other than the CdSe/CdS quantum rod solution can be obtained by the method described in the conventional prior art, and therefore will not be described herein.

As a preferred technical solution of present invention, the preparation method of the CdSe/CdS quantum rod solution comprises the following steps:

(a) dissolving Se powder and S powder in a solvent separately to prepare a Se solution and a S solution;

(b) mixing CdO with a first surface modifier, stirring it under heating until the CdO is completely dissolved and the solution is transparent, and adding the solvent in step (a) and the Se solution obtained in step (a) successively so as to perform a reaction, then cooling it to obtain a CdSe core solution;

(c) purifying the CdSe core solution and dispersing it into an acid solution to form a CdSe acid solution;

(d) mixing CdO with a second surface modifier, stirring it under heating until the CdO is completely dissolved and the solution is transparent, and adding the solvent in step (a), the S solution obtained in step (a) and the CdSe acid solution obtained in step (c) successively so as to perform a reaction, then cooling it to obtain a CdSe/CdS quantum rod solution.

Wherein, the reaction time in step (b) is adjusted according to the required emission wavelength; and the reaction in step (d) is carried out in presence of an acid solvent for coating.

As a preferred technical solution of present invention, the solvent in step (a) is any one selected from the group consisting of tri-n-octylphosphine, tri-n-butylphosphine and diphenylphosphoric acid, and a combination of at least two selected therefrom, wherein the typical but non-limiting examples of the combination include: a combination of tri-n-octylphosphine and tri-n-butylphosphine, a combination of tri-n-butylphosphine and diphenylphosphoric acid, a combination of tri-n-octylphosphine, tri-n-butylphosphine and diphenylphosphoric acid, and the like. Herein, the solvent functions as a surface modifier in addition to acting as a solvent.

Preferably, the Se powder in step (a) is in such an amount that the Se solution has a concentration of 2-3 mmol/mL, e.g. 2 mmol/mL, 2.2 mmol/mL, 2.4 mmol/mL, 2.6 mmol/mL, 2.8 mmol/mL or 3 mmol/mL etc., but not limited to the numerical values recited herein, and other numerical values within this numerical range which are not recited herein are equally applicable, preferably 2.5 mmol/mL.

Preferably, the S powder in step (a) is in such an amount that the S solution has a concentration of 0.5-2 mmol/mL, e.g. 0.5 mmol/mL, 0.7 mmol/mL, 1 mmol/mL, 1.3 mmol/mL, 1.5 mmol/mL, 1.7 mmol/mL or 2 mmol/mL etc., but not limited to the numerical values recited herein, and other numerical values within this numerical range which are not recited herein are equally applicable, preferably 1 mmol/mL;

Preferably, the step (a) comprises dissolving the Se powder and the S powder in the solvent separately, and heating and stirring it until the solution is in a transparent state so as to prepare the Se solution and the S solution.

Preferably, the temperature for the heating and stirring in step (a) is 50° C.-200° C., e.g. 50° C., 70° C., 90° C., 100° C., 130° C., 150° C., 170° C. or 200° C. etc., but not limited to the numerical values recited herein, and other numerical values within this numerical range which are not recited herein are equally applicable.

Preferably, the first surface modifier in step (b) is tetradecylphosphoric acid and/or tri-n-octylphosphine oxide, preferably a combination of tetradecylphosphoric acid and tri-n-octylphosphine oxide. Herein, the first surface modifier further functions as a solvent.

Preferably, the mass ratio of the CdO to the first surface modifier in step (b) is 1: (4-100), e.g. 1:4, 1:10, 1:20, 1:30, 1:40, 1:50, 1:60, 1:70, 1:80, 1:90 or 1:100 etc., but not limited to the numerical values recited herein, and other numerical values within this numerical range which are not recited herein are equally applicable.

Preferably, the temperature for the heating in step (b) is 300° C.-900° C., e.g. 300° C., 310° C., 320° C., 330° C., 340° C., 350° C., 360° C., 370° C., 380° C. or 390° C. etc., but not limited to the numerical values recited herein, and other numerical values within this numerical range which are not recited herein are equally applicable.

As a preferred technical solution, the purification of the CdSe core solution in step (c) comprises purifying the CdSe core solution by centrifugation using chloroform and/or ethanol for 2-3 times.

Preferably, the acid solution in step (c) is any one selected from the group consisting of a tri-n-octylphosphine solution, a tri-n-butylphosphine solution and a diphenylphosphoric acid solution, and a combination of at least two selected therefrom, wherein the typical but non-limiting examples of the combination include: a combination of tri-n-octylphosphine solution and tri-n-butylphosphine solution, a combination of tri-n-butylphosphine solution and diphenylphosphoric acid solution, a combination of tri-n-octylphosphine solution, tri-n-butylphosphine solution and diphenylphosphoric acid solution, and the like.

Preferably, the second surface modifier in step (d) is any one selected from the group consisting of n-hexyl phosphoric acid, tetradecylphosphoric acid and tri-n-octylphosphine oxide, and a combination of at least two selected therefrom, wherein the typical but non-limiting examples of the combination include: a combination of n-hexyl phosphoric acid and tetradecylphosphoric acid, a combination of tetradecylphosphoric acid and tri-n-octylphosphine oxide, a combination of n-hexyl phosphoric acid, tetradecylphosphoric acid and tri-n-octylphosphine oxide, and the like.

Preferably, the mass ratio of the CdO to the second surface modifier in step (d) is 1:(1-80), e.g. 1:1, 1:10, 1:20, 1:30, 1:40, 1:50, 1:60, 1:70 or 1:80 etc., but not limited to the numerical values recited herein, and other numerical values within this numerical range which are not recited herein are equally applicable.

Preferably, the temperature for the heating in step (d) is 260° C.-350° C., e.g. 260° C., 270° C., 280° C., 290° C., 300° C., 310° C., 320° C., 330° C., 340° C. or 350° C. etc., but not limited to the numerical values recited herein, and other numerical values within this numerical range which are not recited herein are equally applicable.

Preferably, the concentration of the CdSe/CdS quantum rod solution in step (d) is 0-30 mg/mL excluding 0, e.g. 0.5 mg/mL, 1 mg/mL, 5 mg/mL, 10 mg/mL, 15 mg/mL, 20 mg/mL, 25 mg/mL or 30 mg/mL etc., but not limited to the numerical values recited herein, and other numerical values within this numerical range which are not recited herein are equally applicable.

The concentration of the CdSe/CdS quantum rod solution in the present invention can be adjusted according to the requirements of actual use, and is not limited to the above concentration range.

Preferably, the temperature for the reaction in step (d) is 300° C.-350° C., e.g. 300° C., 310° C., 320° C., 330° C., 340° C. or 350° C. etc., but not limited to the numerical values recited herein, and other numerical values within this numerical range which are not recited herein are equally applicable.

Preferably, the time for the reaction in step (d) is 3-15 min, e.g. 3 min, 5 min, 7 min, 10 min, 13 min or 15 min etc., but not limited to the numerical values recited herein, and other numerical values within this numerical range which are not recited herein are equally applicable.

As a preferred technical solution of the present invention, the preparation of the polymer solution in step (2) comprises dissolving a polymer in an organic solvent to prepare a polymer solution with a mass concentration of 1%-35%, e.g. 1%, 5%, 10%, 15%, 20%, 25%, 30% or 35% etc., but not limited to the numerical values recited herein, and other numerical values within this numerical range which are not recited herein are equally applicable, preferably a polymer solution with a mass concentration of 10%-35%.

Preferably, the polymer is any one selected from the group consisting of polyvinylpyrrolidone, polymethylmethacrylate and polyacrylonitrile, and a combination of at least two selected therefrom, wherein the typical but non-limiting examples of the combination include: a combination of polyvinylpyrrolidone and polymethylmethacrylate, a combination of polymethylmethacrylate and polyacrylonitrile, a combination of polyvinylpyrrolidone, polymethylmethacrylate and polyacrylonitrile, and the like, preferably polymethylmethacrylate.

Preferably, the organic solvent is any one selected from the group consisting of ethyl acetate, anhydrous ethanol and dimethylformamide, and a combination of at least two selected therefrom, wherein the typical but non-limiting examples of the combination include: a combination of ethyl acetate and anhydrous ethanol, a combination of anhydrous ethanol and dimethylformamide, a combination of ethyl acetate, anhydrous ethanol and dimethylformamide, and the like, preferably dimethylformamide.

Preferably, the volume concentration of fluorescent quantum rods in the electrospinning precursor solution in step (2) is 5%-50%.

As a preferred technical solution of the present invention, in step (3), the electrospinning precursor solution prepared in step (2) is added into the injector of the electrospinning device.

Preferably, in step (3), the voltage of the generator is regulated to be 5 kV-50 kV, e.g. 5 kV, 10 kV, 15 kV, 20 kV, 25 kV, 30 kV, 35 kV, 40 kV, 45 kV or 50 kV etc., but not limited to the numerical values recited herein, and other numerical values within this numerical range which are not recited herein are equally applicable, preferably 5 kV-30 kV.

By adjusting the concentration of the quantum rod solution and parameters in the electrospinning process, the present invention realizes directional arrangements of the quantum rods in the electrospinning process. Therefore, the voltage of the generator in the electrospinning device needs to be controlled within a certain range.

Preferably, the receiving distance in step (3) is a distance between the nozzle and the receiver of the electrospinning device.

Preferably, the receiver is any one selected from the group consisting of an aluminum conical pan, a triangular rotating frame, a rotating drum made of a copper wire frame, a cage-like wire collector and a plate-like wire collector, and a combination of at least two selected therefrom, wherein the typical but non-limiting examples of the combination include: a combination of an aluminum conical pan and a triangular rotating frame, a combination of a rotating drum made of a copper wire frame and a cage-like wire collector, a combination of a cage-like wire collector and a plate-like wire collector, a combination of an aluminum conical pan, a triangular rotating frame and a rotating drum made of a copper wire frame, a combination of a triangular rotating frame, a rotating drum made of a copper wire frame, a cage-like wire collector and a plate-like wire collector, and the like.

Preferably, the receiving distance is regulated to be 5 cm-50 cm, e.g. 5 cm, 7 cm, 10 cm, 13 cm, 15 cm, 17 cm, 20 cm, 23 cm, 25 cm, 27 cm, 30 cm, 33 cm, 35 cm, 37 cm, 40 cm, 43 cm, 45 cm, 47 cm or 50 cm etc., but not limited to the numerical values recited herein, and other numerical values within this numerical range which are not recited herein are equally applicable, preferably 5 cm-25 cm.

By adjusting the concentration of the quantum rod solution and parameters in the electrospinning process, the present invention realizes directional arrangements of the quantum rods in the electrospinning process. Therefore, the receiving distance needs to be controlled within a certain range.

As a preferred technical solution of the present invention, the quantum rod/polymer fiber membrane obtained in step (3) is pressed by a vulcanizing machine to form a transparent film.

In the present invention, the prepared quantum rod/polymer fiber membrane is an non-transparent white loose fiber membrane, and in order to be better applied to the field of optics, the quantum rod/polymer fiber membrane can be pressed by a vulcanizing machine at high temperature and high pressure to obtain a transparent film.

Preferably, the temperature for the pressing process of the vulcanizing machine is 80° C.-170° C., e.g. 80° C., 90° C., 100° C., 110° C., 120° C., 130° C., 140° C., 150° C., 160° C. or 170° C. etc., but not limited to the numerical values recited herein, and other numerical values within this numerical range which are not recited herein are equally applicable, preferably 80° C.-130° C.

Preferably, the pressure for the pressing process of the vulcanizing machine is 1 MPa-20 MPa, e.g. 1 MPa, 3 MPa, 5 MPa, 7 MPa, 10 MPa, 13 MPa, 15 MPa, 17 MPa or 20 MPa etc., but not limited to the numerical values recited herein, and other numerical values within this numerical range which are not recited herein are equally applicable, preferably 1 MPa-10 MPa.

In a second aspect, the present invention provides a quantum rod/polymer fiber membrane prepared by the method described above, wherein the quantum rod/polymer fiber membrane has a polarization degree of 20%-70%, e.g. 20%, 30%, 40%, 50%, 60% or 70% etc., but not limited to the numerical values recited herein, and other numerical values within this numerical range which are not recited herein are equally applicable.

Preferably, the nanofibers in the quantum rod/polymer fiber membrane have a diameter of 200 nm-2000 nm, e.g. 200 nm, 300 nm, 500 nm, 700 nm, 1000 nm, 1300 nm, 1500 nm, 1700 nm or 2000 nm etc., but not limited to the numerical values recited herein, and other numerical values within this numerical range which are not recited herein are equally applicable.

As compared to the existing technologies, the present invention has the following beneficial effects:

(1) the present invention prepares a directional arranged quantum rod/polymer nano-membrane by using electrospinning technique, realizes directional arrangements of the quantum rods in the electrospinning process by adjusting the concentration of the quantum rod solution and parameters in the electrospinning process, so that the obtained quantum rod/polymer nano-membrane has high degree of polarization performance (with a polarization degree of 20%-70%); moreover, the method of the present invention is simple in experimental installation, easy in operation, and the diameter of generated nanofibers is controllable and adjustable and can reach 200 nm-2000 nm;

(2) the method of the present invention is applicable to a plurality of high molecular polymers and has wide applicability;

(3) the quantum rod/polymer fiber membrane prepared by the present invention can be pressed by a vulcanizing machine at high temperature and high pressure to form a transparent film, which can be used as a brightness enhancement film for an optical film, and is an ideal optical material capable of being applied in the optical LED industry.

DETAILED DESCRIPTION

In order to better illustrate the present invention and to facilitate understanding of the technical solutions of the present invention, the present invention will be further described in detail below. However, the following examples are merely illustrative of the present invention and are not representative of or intended to limit the scope of the present invention, and the scope of the present invention is defined by the appended claims.

Specific embodiments of the present invention provide a preparation method of a quantum rod/polymer fiber membrane comprising the following steps:

(1) preparing a quantum rod solution;
(2) preparing a polymer solution, and adding the quantum rod solution obtained in step (1) into the polymer solution so as to form an electrospinning precursor solution with a volume concentration of the quantum rods of 5%-80%;
(3) adding the electrospinning precursor solution prepared in step (2) into an electrospinning device, regulating the voltage of a generator and the receiving distance, and then performing electrospinning to prepare the quantum rod/polymer fiber membrane.

The following are typical but non-limiting examples of the present invention.

Example 1

Provided in this example is a method for preparing a CdSe/CdS quantum rod solution comprising the following steps:

(a) Se powder and S powder were dissolved in tri-n-octylphosphine (TOP) respectively, and heated and stirred at 100° C. until the solution was transparent so as to prepare a Se-TOP solution having a concentration of 2.5 mmol/mL and a S-TOP solution having a concentration of 1 mmol/mL;
(b) 26 mg of CdO was mixed with 112 mg of tetradecylphosphoric acid (TDPA) and 1.5 g of tri-n-octylphosphine oxide (TOPO), heated and stirred at 350° C. until the CdO was completely dissolved and the solution was transparent, and then 0.75 mL of TOP and 0.3 mL of the Se-TOP solution prepared in step (a) were added therein rapidly and successively to perform a reaction, and after the reaction was completed, the entire heating device was turned off and the solution was cooled to room temperature so as to obtain a CdSe core solution;
(c) the CdSe core solution was purified by centrifugation using a system of chloroform and ethanol for 2-3 times, and dispersed into a TOP solution to form a CdSe-TOP solution;
(d) 19 mg of CdO was mixed with 27 mg of hexylphosphoric acid (HPA), 100 mg of tetradecylphosphoric acid (TDPA) and 1 g of tri-n-octylphosphine oxide (TOPO), heated and stirred at 300° C. until the CdO was completely dissolved and the solution was transparent, and then 0.5 mL of TOP, 0.5 mL of the S-TOP solution prepared in step (a) and 0.5 mL of the CdSe-TOP solution prepared in step (c) were added therein rapidly and successively to perform a reaction at 330° C. for 10 min, and after the reaction was completed, the entire heating device was turned off and the solution was cooled to room temperature so as to obtain a CdSe/CdS quantum rod solution.

Example 2

Provided in this example is a method for preparing a CdSe/CdS quantum rod solution, and in the method, the amounts of other materials and preparation process are the same as those in Example 1 except that: a Se-TOP solution having a concentration of 2 mmol/mL and a S-TOP solution having a concentration of 0.5 mmol/mL were prepared by stirring at 50° C. in step (a); the temperature for heating and stirring in step (b) was 300° C.; and in step (d), the temperature for heating and stirring was 260° C., and 0.3 mL of TOP, 0.3 mL of the S-TOP solution prepared in step (a) and 0.2 mL of the CdSe-TOP solution prepared in step (c) were added rapidly and successively to perform a reaction at 300° C. for 15 min. Finally, a CdSe/CdS quantum rod solution was obtained.

Example 3

Provided in this example is a method for preparing a CdSe/CdS quantum rod solution, and in the method, the amounts of other materials and preparation process are the same as those in Example 1 except that: a Se-TOP solution having a concentration of 3 mmol/mL and a S-TOP solution having a concentration of 2 mmol/mL were prepared by stirring at 200° C. in step (a); the temperature for heating and stirring in step (b) was 390° C.; and in step (d), the temperature for heating and stirring was 350° C. and 1 mL of TOP, 1 mL of the S-TOP solution prepared in step (a) and 1 mL of the CdSe-TOP solution prepared in step (c) were added rapidly and successively to perform a reaction at 350° C. for 3 min. Finally, a CdSe/CdS quantum rod solution was obtained.

Example 4

Provided in this example is a preparation method of a quantum rod/polymer fiber membrane comprising the following steps:

(1) a polymer polyvinylpyrrolidone was dissolved in an organic solvent ethyl acetate to prepare a polymer solution having a mass concentration of 20%, and the CdSe/CdS quantum rod solution prepared in Example 1 was added into the polymer solution to form a electrospinning precursor solution with a volume concentration of the quantum rods of 50%;
(2) the prepared electrospinning precursor solution was added into an electrospinning device, and the voltage of a generator was adjusted to be 23 kV-25 kV and the receiving distance was adjusted to be 17 cm-20 cm, then electrospinning was performed to prepare a quantum rod/polymer fiber membrane.

Figure 1:
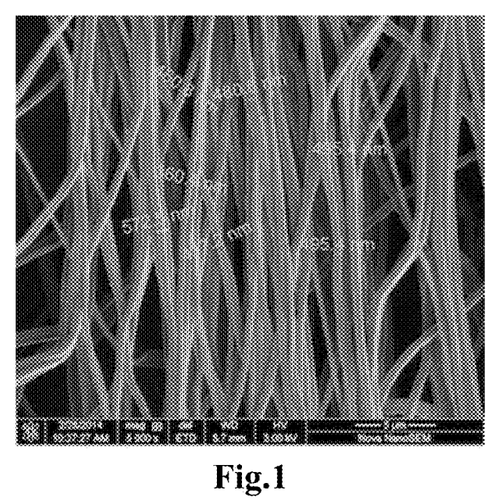
FIG. 1 is an SEM image of a quantum rod/polymer fiber membrane prepared in Example 4 of the present invention.
Figure 2:
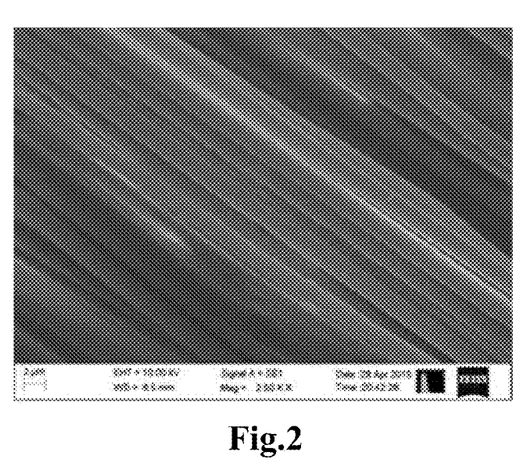
FIG. 2 is a TEM image of a quantum rod/polymer fiber membrane prepared in Example 4 of the present invention.

The obtained quantum rod/polymer fiber membrane was characterized. The scanning electron micrograph thereof is shown in FIG. 1. The transmission electron micrograph thereof is shown in FIG. 2. From the figures, it can be seen that the diameter of the nanofibers is 460-560 nm on average.

Figure 3:
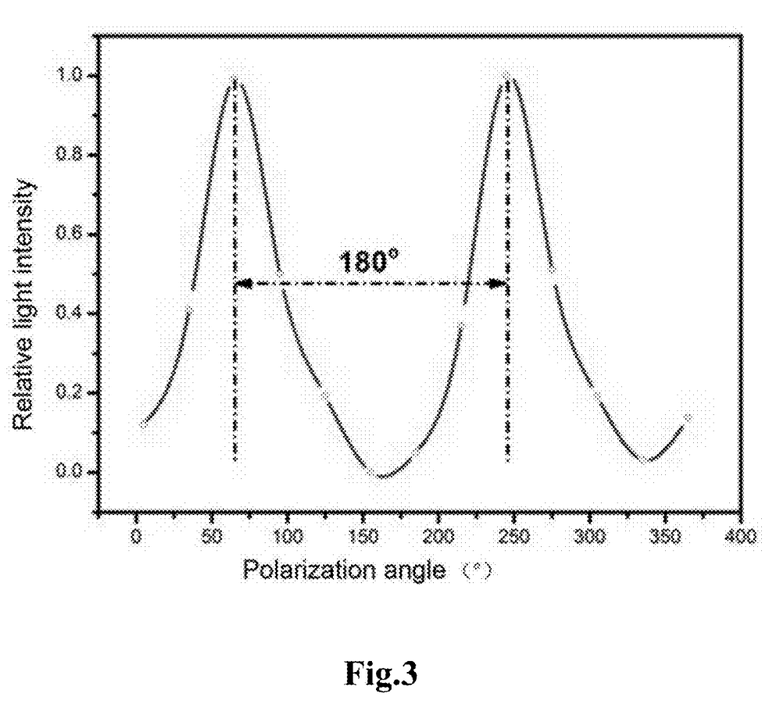
FIG. 3 is a graph showing the characterization of the polarization performance of a quantum rod/polymer fiber membrane prepared in Example 4 of the present invention.

The polarization performance of the obtained quantum rod/polymer fiber membrane was characterized. A screenshot therefrom is shown in FIG. 3. It can be seen from the figure that the quantum rod/polymer fiber membrane prepared by this example has good polarization performance.

Figure 4:
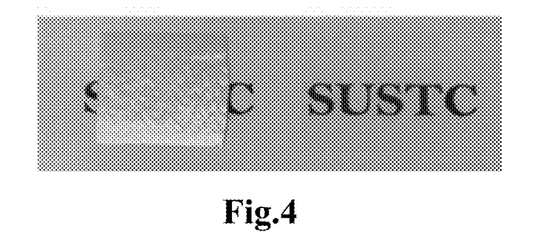
FIG. 4 is a comparative graph of a quantum rod/polymer fiber membrane prepared in Example 4 of the present invention before and after being pressed by a vulcanizing machine.

The prepared quantum rod/polymer fiber membrane is pressed by a vulcanizing machine at high temperature of 80-130° C. and high pressure of 1-10 MPa to prepare a transparent film, of which the comparison to the quantum rod/polymer fiber membranes which was not pressed by a vulcanizing machine is shown in FIG. 4, in which the left side is a quantum rod/polymer fiber membrane which was not pressed by a vulcanizing machine, while the right side is a quantum rod/polymer fiber membrane which was pressed by the vulcanizing machine. It can be seen that a transparent film was formed by pressing the quantum rod/polymer fiber membrane with a vulcanizing machine at high temperature and high pressure.

Example 5

Provided in this example is a preparation method of a quantum rod/polymer fiber membrane comprising the following steps:
(1) a CdTe/ZnTe quantum rod solution was prepared;
(2) a polymer polymethylmethacrylate was dissolved in an organic solvent anhydrous ethanol to prepare a polymer solution having a mass concentration of 1%, and the prepared CdTe/ZnTe quantum rod solution was added into the polymer solution to form a electrospinning precursor solution with a volume concentration of the quantum rods of 5%;
(3) the prepared electrospinning precursor solution was added into an electrospinning device, and the voltage of a generator was adjusted to be 5 kV-7 kV and the receiving distance was adjusted to be 5 cm-7 cm, then electrospinning was performed to prepare a quantum rod/polymer fiber membrane.

The quantum rod/polymer nano-membrane prepared by this example has high degree of polarization performance with a polarization degree of 60%; moreover, the diameter of the generated nanofibers is controllable and adjustable and can reach 200 nm-2000 nm.

Example 6

Provided in this example is a preparation method of a quantum rod/polymer fiber membrane comprising the following steps:
(1) a CdS/ZnS quantum rod solution was prepared;
(2) a polymer polyacrylonitrile was dissolved in an organic solvent anhydrous ethanol to prepare a polymer solution having a mass concentration of 35%, and the prepared CdS/ZnS quantum rod solution was added into the polymer solution to form a electrospinning precursor solution with a volume concentration of the quantum rods of 80%;
(3) the prepared electrospinning precursor solution was added into an electrospinning device, and the voltage of a generator was adjusted to be 48 kV-50 kV and the receiving distance was adjusted to be 23 cm-25 cm, then electrospinning was performed to prepare a quantum rod/polymer fiber membrane.
The quantum rod/polymer nano-membrane prepared by this example has high degree of polarization performance with a polarization degree of 50%; moreover, the diameter of the generated nanofibers is controllable and adjustable and can reach 200 nm-2000 nm.

Example 7

Provided in this example is a method for preparing a quantum rod/polymer fiber membrane, and in the method, except that the quantum rod solution is a CuInS/ZnS quantum rod solution, the amounts of other materials and preparation process are the same as those in Example 2.

The quantum rod/polymer nano-membrane prepared by this example has high degree of polarization performance with a polarization degree of 40%; moreover, the diameter of the generated nanofibers is controllable and adjustable and can reach 200 nm-2000 nm.

Example 8

Provided in this example is a method for preparing a quantum rod/polymer fiber membrane, and in the method, except that the quantum rod solution is a ZnMnSe/ZnS quantum rod solution, the amounts of other materials and preparation process are the same as those in Example 2.

The quantum rod/polymer nano-membrane prepared by this example has high degree of polarization performance with a polarization degree of 40%; moreover, the diameter of the generated nanofibers is controllable and adjustable and can reach 200 nm-2000 nm.

Comparative Example 1

Provided in this comparative example is a quantum rod/polymer fiber membrane, and in the preparation method thereof, except that the volume concentration of the quantum rods in the electrospinning precursor solution in step (2) is 1% (<5%), the amounts of other materials and preparation process are the same as those in Example 2.

The polarization degree of the quantum rod/polymer nano-membrane prepared by this comparative example is only 8%, and the diameter of the generated nanofibers is 200 nm-2000 nm.

Comparative Example 2

Provided in this comparative example is a quantum rod/polymer fiber membrane, and in the preparation method thereof, except that the volume concentration of the quantum rods in the electrospinning precursor solution in step (2) is 90% (>80%), the amounts of other materials and preparation process are the same as those in Example 2.

The polarization degree of the quantum rod/polymer nano-membrane prepared by this comparative example is only 5%, and fibers with stable uniform diameter cannot be formed.

Comparative Example 3

Provided in this comparative example is a quantum rod/polymer fiber membrane, and in the preparation method thereof, except that the voltage of the generator in step (3) is 70 kV (>50 kV), the amounts of other materials and preparation process are the same as those in Example 2.

The polarization degree of the quantum rod/polymer nano-membrane prepared by this comparative example is only 10%, and the diameter of the generated nanofibers is less than 200 nm.

Comparative Example 4

Provided in this comparative example is a quantum rod/polymer fiber membrane, and in the preparation method thereof, except that the voltage of the generator in step (3) is 1 kV (<5 kV), the amounts of other materials and preparation process are the same as those in Example 2.

The polarization degree of the quantum rod/polymer nano-membrane prepared by this comparative example is only 12%, and the diameter of the generated nanofibers is greater than 2000 nm.

Comparative Example 5

Provided in this comparative example is a quantum rod/polymer fiber membrane, and in the preparation method thereof, except that the receiving distance in step (3) is 1 cm (<5 cm), the amounts of other materials and preparation process are the same as those in Example 2.

The polarization degree of the quantum rod/polymer nano-membrane prepared by this comparative example is only 7%, and the diameter of the generated nanofibers is greater than 2000 nm.

Comparative Example 6

Provided in this comparative example is a quantum rod/polymer fiber membrane, and in the preparation method thereof, except that the receiving distance in step (3) is 40 cm (>25 cm), the amounts of other materials and preparation process are the same as those in Example 2.

The polarization degree of the quantum rod/polymer nano-membrane prepared by this comparative example is only 11%, and the fibers are not capable of reaching the receiving surface and thus could not be woven into a membrane.

As can be seen from examples 1-6 and comparative examples 1-6, the present invention prepares a directional arranged quantum rod/polymer nano-membrane by using electrospinning technique, realizes directional arrangements of the quantum rods in the electrospinning process by adjusting the concentration of the quantum rod solution and parameters in the electrospinning process, so that the obtained quantum rod/polymer nano-membrane has high degree of polarization performance (with a polarization degree of 20%-70%); moreover, the method of the present invention is simple in experimental installation, easy in operation, and the diameter of the generated nanofibers is controllable and adjustable and can reach 200 nm-2000 nm. Meanwhile, the method of the present invention is applicable to a plurality of high molecular polymers and has wide applicability. The quantum rod/polymer fiber membrane prepared by the present invention can be pressed by a vulcanizing machine at high temperature and high pressure to form a transparent film, which can be used as a brightness enhancement film for an optical film and is an ideal optical material capable of being applied in the optical LED industry.

The applicant declares that the present invention is described in detail by the above embodiments, but the present invention is not limited to the above detailed methods, that is, it does not mean that the present invention must be implemented in accordance with the detailed methods described above. It will be apparent to those skilled in the art that any modifications to the present invention, equivalent substitutions of the materials of the product of the present invention, additions of auxiliary ingredients, selections of the specific means and the like, are all within the protection and disclosure scopes of the present invention.

What is claimed is:

1. A preparation method of a quantum rod/polymer fiber membrane, comprising the following steps:
   a. (1) preparing a quantum rod solution;
   b. (2) preparing a polymer solution, and adding the quantum rod solution obtained in step (1) into the polymer solution so as to form an electrospinning precursor solution with a volume concentration of the quantum rods of 5%-80%;
   c. (3) adding the electrospinning precursor solution prepared in step (2) into an electrospinning device, regulating the voltage of a generator and the receiving distance, and then performing electrospinning to prepare the quantum rod/polymer fiber membrane;
   wherein the quantum rod solution in step (1) is prepared from a quantum material;
   the quantum rod solution is a CdSe/CdS quantum rod solution prepared from a core-shell coated material having CdSe as a core and CdS as a shell layer material;
   the preparation method of the CdSe/CdS quantum rod solution comprises the following steps:
   a. dissolving Se powder and S powder in a solvent separately to prepare a Se solution and a S solution;
   b. mixing CdO with a first surface modifier, stirring it under heating until the CdO is completely dissolved and the solution is transparent, and adding the solvent in step (a) and the Se solution obtained in step (a) successively so as to perform a reaction, then cooling it to obtain a CdSe core solution;
   c. purifying the CdSe core solution and dispersing it into an acid solution to form a CdSe acid solution;
   d. mixing CdO with a second surface modifier, stirring it under heating until the CdO is completely dissolved and the solution is transparent, and adding the solvent in step (a), the S solution obtained in step (a) and the CdSe acid solution obtained in step (c) successively so as to perform a reaction, then cooling it to obtain a CdSe/CdS quantum rod solution.

2. The preparation method according to claim 1, wherein the quantum material is a single-core material and/or a core-shell coated material.

3. The preparation method according to claim 2, wherein the single-core material is any one selected from the group consisting of CdSe, CdTe, CdS, ZnSe, CdTe, CuInS, InP, CuZnSe and ZnMnSe, and a combination of at least two selected therefrom.

4. The preparation method according to claim 2, wherein the core-shell coated material has a single core material as a core thereof and a shell layer material selected from the group consisting of CdS, ZnO, ZnS, ZnSe and ZnTe, and a combination of at least two selected therefrom.

5. The preparation method according to claim 1, wherein the quantum material is a core-shell coated material.

6. The preparation method according to claim 1, wherein the solvent in step (a) is any one selected from the group consisting of tri-n-octylphosphine, tri-n-butylphosphine and diphenylphosphoric acid, and a combination of at least two selected therefrom.

7. The preparation method according to claim 6, wherein the Se powder in step (a) is in such an amount that the Se solution has a concentration of 2-3 mmol/mL;
   the S powder in step (a) is in such an amount that the S solution has a concentration of 0.5-2 mmol/mL;
   the step (a) comprises dissolving the Se powder and the S powder in the solvent separately, and heating and stirring it until the solution is in a transparent state so as to prepare the Se solution and the S solution;
   the temperature for the heating and stirring in step (a) is 50° C.-200° C.;
   the first surface modifier in step (b) is selected from at least one of: tetradecylphosphoric acid and/or tri-n-octylphosphine oxide, or a combination of tetradecylphosphoric acid and tri-n-octylphosphine oxide;
   the mass ratio of the CdO to the first surface modifier in step (b) is 1:(4-100);
   the temperature for the heating in the step (b) is 300° C.-390° C.

8. The preparation method according to claim 1, wherein the purification of the CdSe core solution in step (c) comprises purifying the CdSe core solution by centrifugation using chloroform and/or ethanol for 2-3 times.

9. The preparation method according to claim 8, wherein the acid solution in step (c) is any one selected from the group consisting of a tri-n-octylphosphine solution, a tri-n-butylphosphine solution and a diphenylphosphoric acid solution, and a combination of at least two selected therefrom;

the second surface modifier in step (d) is any one selected from the group consisting of n-hexyl phosphoric acid, tetradecylphosphoric acid and tri-n-octylphosphine oxide, and a combination of at least two selected therefrom;

the mass ratio of the CdO to the second surface modifier in step (d) is 1:(1-80);

the temperature for the heating in step (d) is 260° C.–350° C.;

the concentration of the CdSe/CdS quantum rod solution in step (d) is 0-30 mg/mL excluding 0;

the temperature for the reaction in step (d) is 300° C.-350° C.;

the time for the reaction in step (d) is 3-15 min.

10. The preparation method according to claim 1, wherein the preparation of the polymer solution in step (2) comprises dissolving a polymer in an organic solvent to prepare a polymer solution with a mass concentration of 1%-35%.

11. The preparation method according to claim 10, wherein the polymer is any one selected from the group consisting of polyvinylpyrrolidone, polymethylmethacrylate and polyacrylonitrile, and a combination of at least two selected therefrom;

the organic solvent is any one selected from the group consisting of ethyl acetate, anhydrous ethanol and dimethylformamide, and a combination of at least two selected therefrom;

the volume concentration of fluorescent quantum rods in the electrospinning precursor solution in step (2) is 5%-50%.

12. The preparation method according to claim 1, wherein in step (3), the electrospinning precursor solution prepared in step (2) is added into an injector of the electrospinning device.

13. The preparation method according to claim 12, wherein in step (3), the voltage of the generator is regulated to be 5 kV-50 kV;

the receiving distance in step (3) is a distance between the nozzle and the receiver of the electrospinning device;

the receiver is any one selected from the group consisting of an aluminum conical pan, a triangular rotating frame, a rotating drum made of a copper wire frame, a cage-like wire collector and a plate-like wire collector, and a combination of at least two selected therefrom;

the receiving distance is regulated to be 5 cm-50 cm.

14. The preparation method according to claim 1, wherein the quantum rod/polymer fiber membrane obtained in step (3) is pressed by a vulcanizing machine to form a transparent film.

15. The preparation method according to claim 14, wherein a temperature for the pressing process of the vulcanizing machine is 80° C.–170° C.;

the pressure for the pressing process of the vulcanizing machine is 1 MPa-20 MPa.

* * * * *